(12) United States Patent
Bucheru

(10) Patent No.: US 10,742,125 B1
(45) Date of Patent: Aug. 11, 2020

(54) DIRECT FEEDBACK FOR ISOLATED SWITCHING CONVERTERS

(71) Applicant: Apple Inc., Cupertino, CA (US)

(72) Inventor: Bogdan T. Bucheru, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/420,965

(22) Filed: May 23, 2019

Related U.S. Application Data

(60) Provisional application No. 62/811,348, filed on Feb. 27, 2019.

(51) Int. Cl.
*H02M 3/335* (2006.01)
*H02M 1/08* (2006.01)

(52) U.S. Cl.
CPC ......... *H02M 3/33576* (2013.01); *H02M 1/08* (2013.01)

(58) Field of Classification Search
CPC ......... H02M 3/33507; H02M 3/33569; H02M 3/33576; H02M 3/338; H02M 3/3381; H02M 1/08; H02M 2001/0032; Y02B 70/126; Y02B 70/1433
USPC ........................................... 363/21.12–21.18
See application file for complete search history.

(56) References Cited

U.S. PATENT DOCUMENTS

| | | | | |
|---|---|---|---|---|
| 5,479,090 A * | 12/1995 | Schultz | ..................... | G05F 1/56 |
| | | | | 323/284 |
| 6,822,882 B1 * | 11/2004 | Jacobs | .............. | H02M 3/33592 |
| | | | | 363/21.06 |
| 8,289,732 B2 * | 10/2012 | Li | ..................... | H02M 3/33515 |
| | | | | 363/21.12 |
| 8,520,414 B2 * | 8/2013 | Garrity | ............. | H02M 3/33569 |
| | | | | 363/21.14 |
| 8,730,688 B2 * | 5/2014 | Hsu | ................... | H02M 3/33561 |
| | | | | 363/21.14 |
| 9,553,501 B2 * | 1/2017 | Yao | ........................ | H02M 3/156 |
| 10,277,110 B2 * | 4/2019 | Yao | ........................ | H02H 9/025 |
| 10,389,275 B2 * | 8/2019 | Notsch | .............. | H02M 3/33584 |
| 2007/0080674 A1 * | 4/2007 | Gray | .................. | H02M 3/1588 |
| | | | | 323/282 |
| 2007/0159857 A1 * | 7/2007 | Lee | ........................ | H02M 1/34 |
| | | | | 363/21.12 |
| 2011/0062929 A1 * | 3/2011 | Strydom | ............... | H02M 3/158 |
| | | | | 323/284 |

(Continued)

*Primary Examiner* — Yemane Mehari
(74) *Attorney, Agent, or Firm* — Blank Rome LLP

(57) ABSTRACT

A direct feedback isolated power converter can include a transformer with primary, secondary, and bias windings. A main switch can selectively enable and disable current flow through the primary winding. A controller coupled to the bias winding may be configured to generate a gate drive signal for the main switch responsive at least in part to free ringing of the transformer. The controller may detect the free ringing via the bias winding. An auxiliary switch coupled across the secondary winding may be configured to selectively short circuit the secondary winding, responsive to feedback circuitry, to control when free ringing is established. The feedback circuitry may include a proportional, proportional integral, or proportional-integral-derivative control loop, a hysteretic control loop, or other controller type. The controller may operate at a variable or fixed frequency. The direct feedback isolated power converter may be a flyback converter or other type of isolated converter.

20 Claims, 3 Drawing Sheets

(56) References Cited

U.S. PATENT DOCUMENTS

| | | | |
|---|---|---|---|
| 2011/0310639 A1* | 12/2011 | Hsu | H02M 3/33561 363/21.14 |
| 2012/0319604 A1* | 12/2012 | Walters | H05B 45/3725 315/200 R |
| 2017/0250620 A1* | 8/2017 | White | H02M 1/15 |

* cited by examiner

DIRECT FEEDBACK FOR ISOLATED SWITCHING CONVERTERS

BACKGROUND

Switching power supplies, also known as power converters or switching converters, often use one or more magnetic elements, such as transformers or inductors, to process power or energy from an input source and deliver it to an output load. In many applications, isolated converters, which provide electrical isolation between the input source and output load, are desirable or required by various regulations. In isolated converters, a transformer may be used as the isolation element (i.e., an isolation transformer). In such applications the transformer provides electrical isolation between the input/primary side of the transformer and the output/secondary side of the transformer. In many applications, the isolation transformer may also serve as the magnetic element of the converter. Examples of such converters include flyback converters and isolated forward converters.

In any power converter, power is transferred forward from source to load. Effective control of the converter may also require a feedback loop from load to source so that appropriate output electrical characteristics, e.g., voltage and/or current, can be maintained. Thus, a feedback loop may be established between the load and input to control and adjust the power flow as required. This results in what is known as closed loop operation, and many control techniques for closed loop operation are known in the art. In general, these closed loop control techniques include a reference device that sets a desired value for a regulated output parameter (such as an output voltage setpoint), a sensor that senses the value of the output parameter to be regulated, and a mechanism for comparing reference to the sensed value and altering operation of the converter to make the sensed value match the reference. Exemplary closed loop controllers include, proportional controllers, proportional-integral (PI) controllers, proportional-integral-derivative (PID) controllers, hysteretic controllers, digital controllers, etc.

For non-isolated switching converters closing the feedback control loop is straight-forward. A direct electrical connection can suffice because the input and output are referred to the same electrical ground, and the switching controller (PWM controller) and the feedback reference and network are all in the same place. However, for isolated converters, feedback control requires a mechanism for safely getting the sensed output signal across the isolation barrier provided by the transformer. Two common solutions are magnetic coupling (using an additional signal transformer or one or more auxiliary windings of the power transformer) and optical coupling. Both techniques have drawbacks. With respect to magnetic coupling, separate signal transformers are bulky, expensive, and complicate controller design because of the impacts their performance has on the feedback signal. Auxiliary windings may complicate as well as compromise design of the power transformer while also causing controller complication issues similar to a separate signal transformer. Although optocouplers are usually cheaper and smaller, they are bandwidth limited, subject to high levels of variation with response to temperature, and subject to wide variations in gain and other performance metrics from piece-to-piece, lot-to-lot, and vendor-to-vendor.

Because of these and other limitations in providing feedback loops in isolated power converters, isolated converters to date have largely used relatively straightforward PID loop control, which has limited the ability of power converter designers to adopt higher performing control techniques that could potentially maximize power converter performance. Thus, what is needed in the art are improved feedback techniques for isolated power converters.

SUMMARY

A direct feedback isolated power converter can include a transformer having a primary winding coupled to an input source, a secondary winding coupled to an output load, and a bias winding. A main switch can be configured to selectively enable and disable current flow through the primary winding. A controller coupled to the bias winding may be configured to generate a gate drive signal for the main switch responsive at least in part to free ringing of the transformer. The free ringing may be detected via the bias winding. An auxiliary switch coupled across the secondary winding may be configured to selectively short circuit the secondary winding, responsive to feedback circuitry, to control when free ringing is established. The feedback circuitry may be configured to turn off the auxiliary switch to establish free ringing of the transformer. The feedback circuitry may include a proportional, proportional integral, or proportional-integral-derivative control loop, a hysteretic control loop, or other controller type. The controller may be configured to turn on the main switch responsive to establishment of free ringing of the transformer, and may operate at a variable or fixed frequency. The direct feedback isolated power converter may be a flyback converter or other type of isolated converter.

A method of providing direct feedback control in an isolated power converter that includes a transformer, a main switch coupled to a primary winding of the transformer, and an auxiliary switch coupled across a secondary winding of the transformer so as to selectively short circuit the secondary winding can include using a feedback circuit on a secondary side of the converter to detect an output load on the converter and, responsive thereto, provide a variably delayed gate drive signal to the auxiliary switch. The variable delay may be increased in response to a light load on the converter and decreased in response to a relatively higher load on the converter. The variable delay may determine timing of establishment of free ringing of the transformer. The method can further include using a controller on the primary side of the converter and coupled to the auxiliary winding to selectively activate the main switch responsive at least in part to the establishment of free ringing. Using the PWM controller to selectively activate the main switch may include selectively activating the main switch at a variable frequency or at a fixed frequency. Selectively activating the main switch at a fixed frequency can include turning off the main switch responsive to a clock signal and turning on the main switch responsive to free ringing of the transformer. The feedback circuit can include a proportional, proportional integral, or proportional-integral-derivative control loop, a hysteretic control loop, or other suitable control loop.

A direct feedback flyback converter can include a transformer having a primary winding electrically coupled to an input source, a secondary winding electrically coupled to an output load, and a bias winding, with the windings being magnetically coupled to one another. A main switch may be coupled in series with the primary winding and responsive to a controller to alternately close (thereby storing energy from the input source in the transformer) and open (thereby transferring the stored energy from the transformer to the load via the secondary winding). An auxiliary switch may be coupled across the secondary winding and controlled responsive to a feedback circuit to selectively short circuit the secondary winding to control when free ringing of the transformer is established. The feedback circuit may be coupled to an output voltage of the converter and the controller is coupled to the bias winding. The flyback converter may further include a diode coupled in series with the auxiliary switch and configured to block current through the auxiliary switch during transformer reset. The controller operates at a variable or fixed frequency.

DETAILED DESCRIPTION

Figure 1:
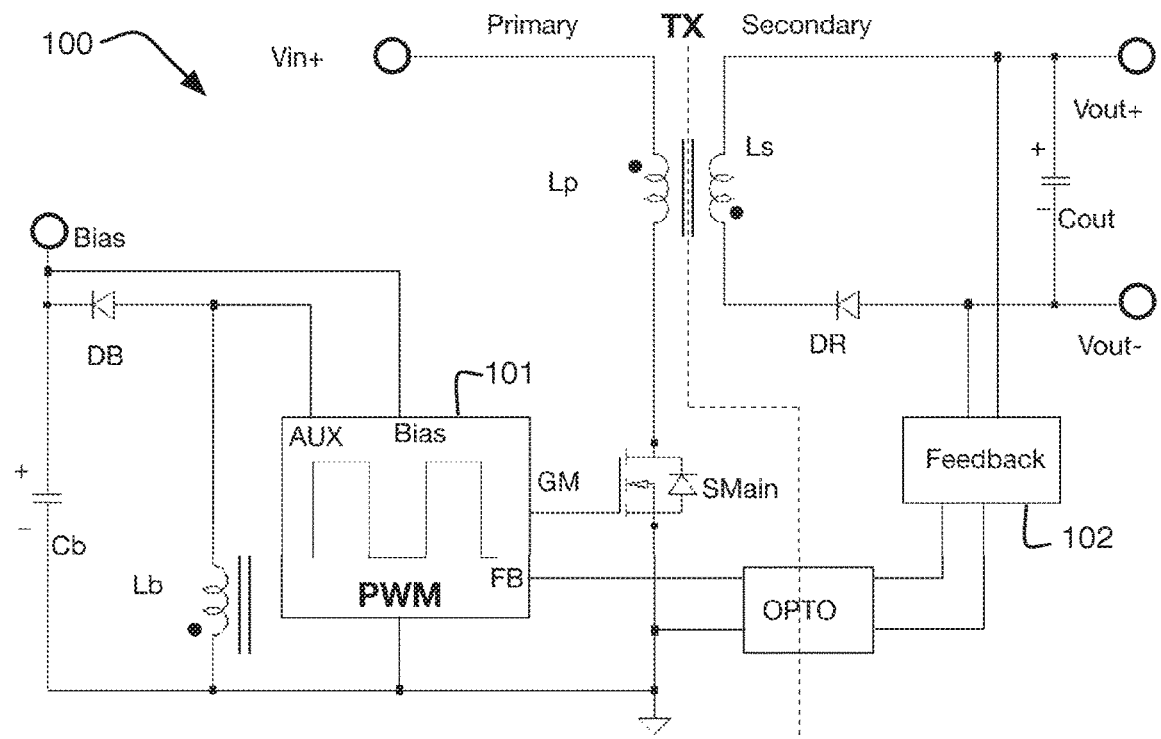
FIG. 1 depicts a flyback converter with an optically isolated feedback loop.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Different power converter topologies have been developed in the switching power supply industry to accommodate often contradictory requirements and improve performance of power converters. One commonly used isolated topology is the flyback topology, which is part of the single-ended family of topologies. The flyback converter's simplicity and flexibility (e.g., high input/output voltage range) makes it a common choice for relatively low power (e.g., 0-100 W) AC/DC adapters, such as those used as adapters/chargers for portable electronic devices such as cellular telephones, smart phones, tablet computers, notebook/laptop computers, and the like. For ease of discussion the flyback topology is used to illustrate the concepts described herein. however, it will be appreciated that the feedback techniques and structures described herein may be applied to other isolated converter topologies, such as forward converters, half-bridge converters, full-bridge converters, and phase shift converters. Thus, it will be appreciated that the following concepts may be applied to any isolated converter.

An exemplary flyback converter 100 is illustrated in FIG. 1. Flyback converter 100 can use the magnetic transformer (or, more precisely, coupled inductors) to isolate the primary side electrical power and transform it to a secondary side that delivers the said electrical power to the load. Flyback converter 100 includes a transformer TX, which has a primary winding Lp, connected between the ground in input power rail Vin+/Vin−, through a main switch MS (typically a MOSFET, although other switch types could be used). Primary switch MS may be controlled through its gate signal MG by a pulse width modulation (PWM) controller 101. Transformer TX also has a secondary winding Ls, which may be connected to the output by a rectifier diode DR. In some embodiments, output rectifier diode DR may be replaced by a synchronous rectifier switching device. The output current may be filtered by the output capacitor Cout, with the output voltage Vout appearing thereacross. A feedback loop can include secondary feedback circuitry 102, which can serve to sense and suitably condition the output voltage (or other regulated parameter) to generate a feedback signal. The feedback loop can also include an optocoupler OPTO, which relays the feedback signal across the safety isolation barrier to PWM controller 101.

In addition to the main power delivery, a bias supply/voltage may be created to power the control circuitry and provide the bias voltage required for main switch SM. The bias supply may also be used to provide bias voltage for and any other switching devices, such as an active clamp switch, that may be included on the primary side. One technique that may be used to derive the bias supply is to add an auxiliary winding (a/k/a bias winding) Lb to transformer TX. The voltage from auxiliary winding Lb may be rectified (by diode DB) and stored (in capacitor Cb). In some applications additional auxiliary windings or other bias supply arrangements may be provided. For example, a secondary side bias supply circuit may use an auxiliary winding to provide power for control electronics and transistor bias on the secondary side of the converter.

Flyback converter 100 can operate in continuous conduction mode (CCM), discontinuous conduction mode (DCM), or at the boundary between CCM and DCM, which is known as the critical conduction mode (CrCM), boundary mode, or quasi-resonant (QR) mode. Flyback converter 100's operation may also be described as either fixed switching frequency or variable switching frequency. In various applications, each of the foregoing operating modes may be advantageous. Many modern pulse width modulation (PWM) controllers are adaptable, allowing the converter to switch between modes during operation as conditions warrant. Conditions that may vary in operation include input voltage, output voltage, and load. For example, an AC/DC adapter/charger may need to operate with an input range varying over a range of 5:1 or more. Similarly, in applications such as USB-PD (universal serial bus power deliver) output voltage may vary over a range of 4:1 (e.g., 5 VDC to 20 VDC) or more. Additionally, load may vary widely depending on whether a device is operating, sleeping, charging a battery, etc.

Some flyback controllers may employ QR mode operation (also known as the QR0 mode) under high load conditions. Such controllers may also limit or reduce the switching frequency under lighter load conditions by employing a control technique known as "valley hopping" or "valley skipping." In a valley hopping operation, a timer and/or a counter incorporated in PWM controller 101 monitors the transformer voltage, particularly the voltage associated with the transformer "reset," when the energy stored in the transformer is discharged into the load. In some embodiments, PWM controller 101 may look for the free ringing associated with the transformer reset by monitoring the auxiliary winding Lb. As load on the converter decreases, PWM controller 101 may chooses to skip one cycle of the free ringing associated with the transformer reset, and then turn on for the second valley. This is sometimes known as the QR1 mode of operation. Under still lighter load, PWM controller 101 may skip two valleys of the free ringing voltage associated with the transformer reset, and turn on the main switch for the next one, sometimes known as QR2, and so-on. These "QRn" operating modes often provide a good tradeoff between operating efficiency and noise, particularly for high input voltages.

"Valley hopping" operation is, in essence, a frequency control method. In other words, for high load conditions the operating frequency is effectively increased (because main switch SMain is engaged as soon as possible after transformer reset). For lighter load conditions, the operating frequency is effectively lowered by increasing the time between successive turn on events of main switch SMain. However, the frequency changes are inherently in discrete steps, which are given by the TX free ringing period. As a result, output power may not be controllable as linearly as desired for a given application or operating condition. Thus, in some embodiments, PWM controller 101 may also apply on-time control for a smooth and stable output power delivery. This effectively regulates the duty cycle of the main switch, also responsive to load conditions.

In order for PWM controller 101 to implement the above-described operations, two signals may be used by PWM controller 101. First, the feedback signal FB, indicative of output load on the converter, may be delivered through the feedback loop that includes feedback circuitry 102 and opto-coupler OPTO. Feedback signal FB may be a signal corresponding to the output voltage Vout, which may be indicative of load changes on the converter. For example, an increase in load may cause the output voltage to decrease, while a decrease in output load may cause the output voltage to increase. The second signal may be the auxiliary winding voltage AUX, which may be a scaled and mirrored version of the voltage appearing across the transformer primary winding Lp. This signal will exhibit the ringing and valleys discussed above, which will be counted by PWM circuit 101 and used to trigger the on time of main switch SMain.

Figure 2:
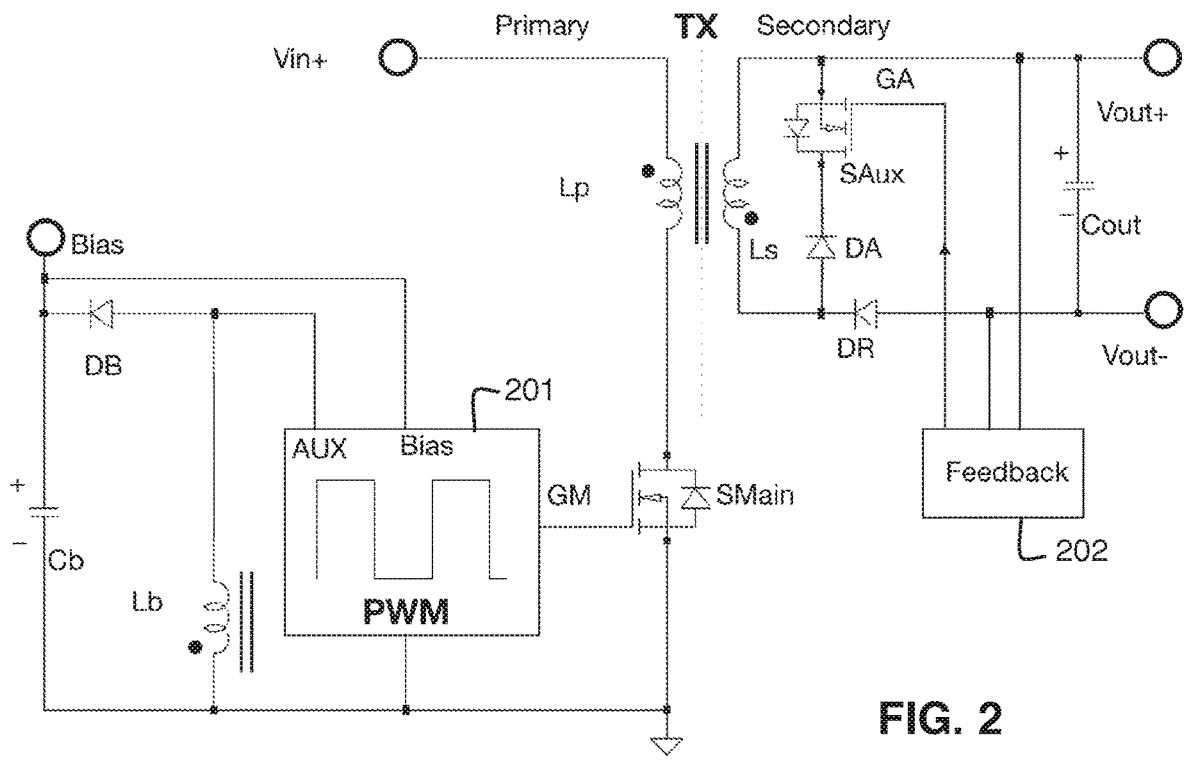
FIG. 2 depicts a flyback converter with direct feedback.

FIG. 2 illustrates an embodiment of a direct feedback isolated converter, which is, more specifically, a direct feedback flyback converter 200. Flyback converter 200 differs structurally from flyback converter 100 in that opto-coupler OPTO and the associated feedback path have been eliminated. Additionally, an active auxiliary switch SAux has been added across secondary winding Ls in series with diode DA. Auxiliary switch SAux is illustrated as a MOSFET, but may be any other type of switching device suitable for a given application. As described in greater detail below, auxiliary switch SAux may function to control when the free ringing associated with the reset of transformer TX appears on the primary side, e.g., across bias winding Lb. Diode DA may function to block current flow through auxiliary switch SAux during transformer reset, i.e., the time period during which output rectifier DR is active and the converter is delivering power to the output.

Figure 3:
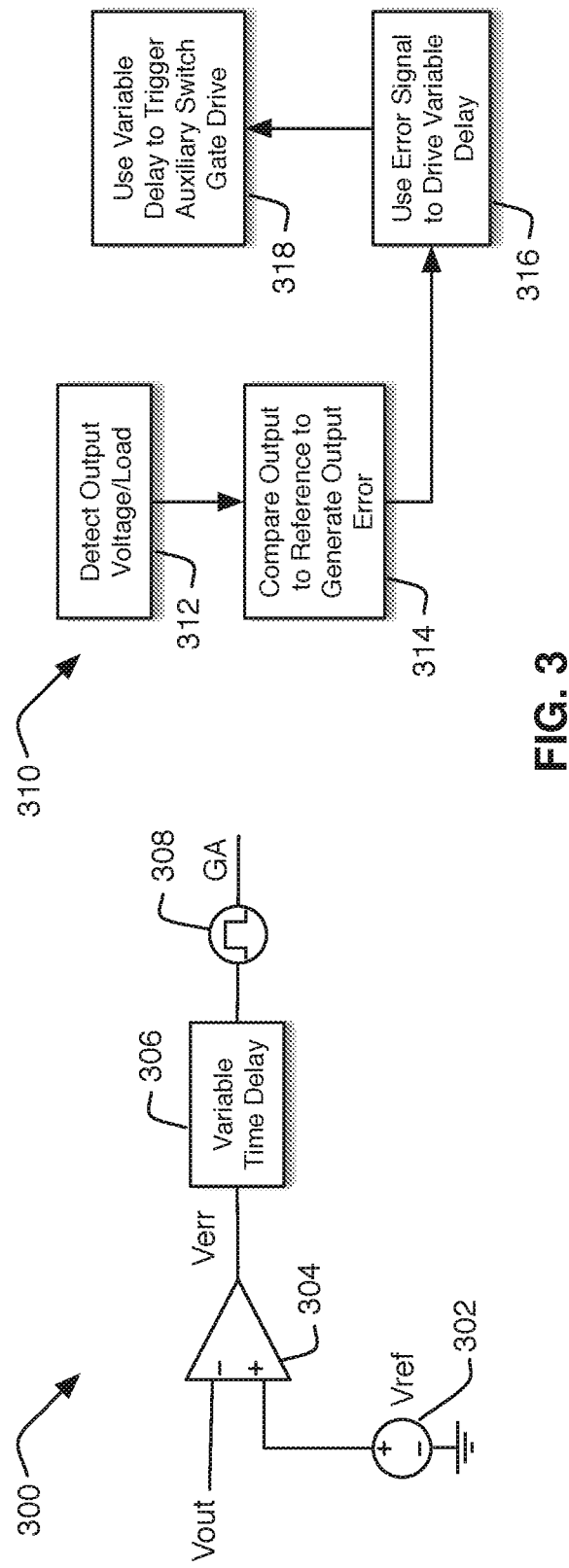
FIG. 3 illustrates a block diagram and a flowchart of feedback circuitry for a direct feedback flyback converter.

Feedback circuitry 202 may be configured to control the gate signal GA for auxiliary switch SAux such that secondary winding Ls is practically short circuited when SAux is active and transformer TX wants to reverse polarity during its free ringing. As a result, the magnetizing current can be trapped, flowing through the low impedance of diode DA and auxiliary switch SAux. Only when auxiliary switch SAux is turned-off by feedback circuitry 202 can the free-ringing of transformer TX be re-established. Thus, feedback circuitry 202 can suspend or delay the free-ringing for a time period of its choosing. In one embodiment, feedback circuitry 202 may implement a simple feedback algorithm in which high or maximum output power for the converter generates a zero delay (meaning SAux is not closed), with decreasing power levels resulting in an increase in the delay time. An exemplary block diagram 300 and corresponding flow chart 310 for feedback circuitry 202 are illustrated in FIG. 3.

Block diagram 300 is a high level block diagram of feedback circuitry 202. This circuitry may be implemented in a variety of forms, including analog circuitry, discrete circuitry using components such as logic gates, flip-flops, time delays, and the like, or with a microcontroller, FPGA, or other integrated controller circuitry, as well as various combinations of the foregoing. Feedback circuitry 202 may receive as an input the output voltage Vout of the converter 200. Output voltage Vout may be used to infer converter load by comparing it to a reference voltage Vref (using comparator 304) to generate an error signal Verr. Error signal Verr thus indicates the load, or change of load, on the converter, with increasing positive values of Verr indicating increasing load and increasing negative values indicating decreasing load. This error signal may be provided to variable time delay circuit 306 which controls the gate drive generator circuit 308, which provides gate drive signal GA to auxiliary switch SAux. Variable time delay circuit 306 may be configured to provide an increased time delay as the load decreases or to provide a decreased time delay as the load increases. This delay can trigger when gate drive generator 308 provides gate drive signal GA to auxiliary switch SAux as described above and below with respect to FIG. 4.

Flow chart 310 depicts in flow chart form the operation of feedback circuitry 202. At block 312, the output voltage/output load are detected. At block 314, this output voltage/load may be compared to a reference to generate an output error signal. The output error signal may be used, in block 316, to drive a variable delay circuit that is configured to increase its delay in response to decreasing load or decrease its delay in response to increasing load. This delay may then be used, in block 318, to trigger the auxiliary switch gate drive signal as described above and below with respect to FIG. 4.

Figure 4:
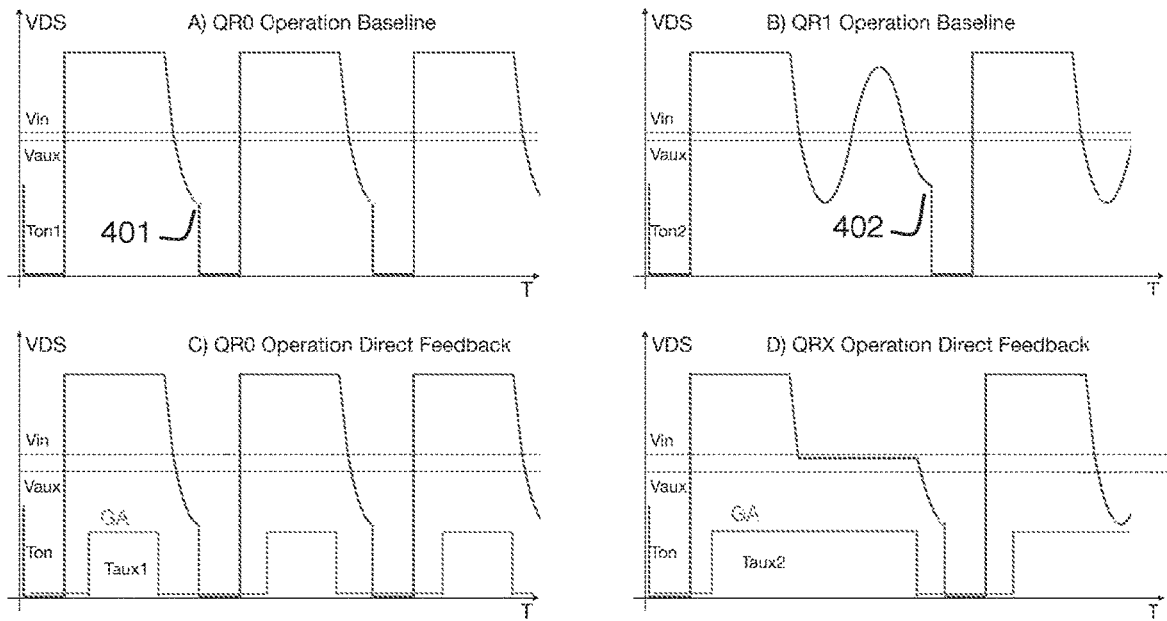
FIG. 4 illustrates certain waveforms for a conventional flyback converter and a flyback converter with direct feedback operating at a variable switching frequency.

FIG. 4 illustrates operation of flyback converter 101 in blocks A and B and operation of direct feedback flyback converter 200 in blocks C and D. In each block, the drain to source voltage (VDS) across main switch SMain is plotted for multiple switching cycles. In blocks C and D, corresponding to operation of direct feedback flyback converter 200, gate drive signal GA for auxiliary switch SAux is also presented. The width of these gate drive pulses (i.e., Taux1 in block C and Taux2 in block D) may be determined by feedback circuitry 202.

For flyback converter 100, gate signal GM of the main switch SM is controlling the on time Ton of the switch. When gate drive signal GM is high, main switch SMain is turned on, and VDS is zero. Under high load conditions (block A) this on time Ton1 is greater than the on time Ton2 corresponding to a light load condition (block B). The QR mode of operation with valley-hopping may be established by PWM controller 101, which may monitor the AUX signal from bias winding Lb. The effective voltage Vaux (which may be practically close to the input voltage Vin) may be used to trigger a new switching cycle. More specifically, the switching operation may be triggered by the VDS voltage ringing down to a first valley (401) or subsequent valley (402) of the transformer free ringing voltage appearing across the main switch.

For flyback converter 200, corresponding full load and lighter load conditions and operations are presented in blocks C and D, respectively. As noted above, blocks C and D also illustrate the gate drive signal GA for auxiliary switch SAux, the on time of which (Taux) controls operation of the converter. In block C, the QR0 mode of operation can be achieved when Taux1 is shorter than the reset time of transformer TX, so that it does not interfere with the TX free-ringing. In block D, extending the on time Taux2 of auxiliary switch SAux can allow the converter to operate in QRx (valley skipping modes). As a result, the on time Ton of main switch SMain does not have to change to regulate output power of the converter. As illustrated in block D, corresponding to lighter load operation, only the duration of auxiliary switch SAux's gate drive signal GA increases. By extending Taux2 to greater than the TX reset time, QRx operation may be achieved without the need for PWM controller 201 to count the ringing cycles of transformer TX. As an additional effect of the direct feedback technique, timing of the VDS voltage minimum that triggers turn on of the main switch may be controlled exactly, rather than in discrete frequency/timing steps (as described above with respect to FIG. 1). This allows for implementation of continuous frequency control algorithms. In other words, feedback circuitry 202 can easily employ a PID control algorithm, a hysteretic control algorithm, or any other suitable control techniques, just as in a non-isolated converter.

Figure 5:
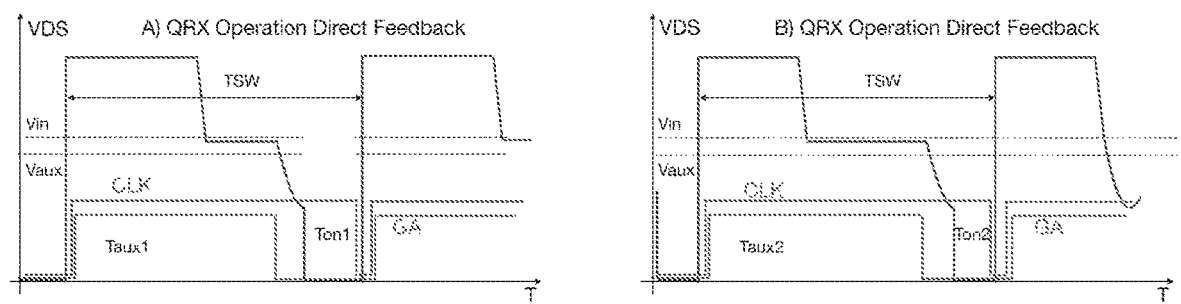
FIG. 5 illustrates certain waveforms for a direct feedback flyback converter operating at a fixed switching frequency.

In some applications, variable frequency operation may not suitable and/or a fixed frequency mode of operation may be desired. For such cases, a direct feedback flyback converter may be implemented, with certain changes to the primary side PWM controller 201. More specifically, PWM controller 201 can include an internal timer/clock (having a clock signal CLK) to establish a switching period TSW of main switch SMain. FIG. 5 illustrates the VDS voltage for main switch SMain, the clock signal CLK, and the gate drive signal GA for auxiliary switch SAux for such an embodiment in a higher load condition (block A) and a lighter load condition (block B).

In the fixed frequency case, PWM controller 201 turns off main switch SMain by transitioning gate drive signal GM low responsive to the falling edge at the beginning of clock period CLK (i.e., falling edge control). The turn on (or duty cycle) of main switch SMain may be controlled responsive to transformer ringing detection, which may be controlled by switching auxiliary switch SAux as described above. More specifically, feedback circuitry 202 may control the gate signal GA to delay the free ringing of transformer TX, with increased delay corresponding to decreasing load. PWM controller 201 may turn on main switch when a minimum of this ringing cycle is detected. As a result, the on time Ton of converter 200 may be given by: Ton≈CLK−GA. Thus, a straightforward linear controller is established, in which secondary feedback circuitry 202 can directly modulate the on time duration of gate drive signal GM for main switch SMain by controlling the gate signal GA of auxiliary switch SAux. The resulting control is a pure fixed-frequency mode of operation. Thus, feedback circuitry 202 can easily employ a PID controller, a hysteretic controller, or any other suitable control technique (as in non-isolated converters).

Described above are various features and embodiments relating to direct feedback isolated power converters. Such converters may be used in a variety of applications, but may be particularly advantageous when used for universal AC/DC converters (e.g., chargers) for personal electronic devices and the like.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A direct feedback isolated power converter comprising:
a transformer having a primary winding coupled to an input source, a secondary winding coupled to an output load, and a bias winding;
a main switch configured to selectively enable and disable current flow through the primary winding;
a controller coupled to the bias winding and configured to generate a gate drive signal for the main switch responsive at least in part to free ringing of the transformer detected via the bias winding;
an auxiliary switch coupled across the secondary winding and configured to selectively short circuit the secondary winding responsive to feedback circuitry to control when free ringing of the transformer is established.

2. The direct feedback isolated power converter of claim 1, wherein the feedback circuitry is configured to turn off the auxiliary switch to establish free ringing of the transformer.

3. The direct feedback isolated power converter of claim 2, wherein the feedback circuitry includes a proportional, proportional integral, or proportional-integral-derivative control loop.

4. The direct feedback isolated power converter of claim 2, wherein the feedback circuitry includes a hysteretic control loop.

5. The direct feedback isolated power converter of claim 2, wherein the PWM controller is configured to turn on the main switch responsive to establishment of free ringing of the transformer.

6. The direct feedback isolated power converter of claim 5, wherein the PWM controller operates at a variable frequency.

7. The direct feedback isolated power converter of claim 2, wherein the PWM controller comprises a clock configured to turn on the main switch at a fixed frequency.

8. The direct feedback isolated power converter of claim 7, wherein the PWM controller is configured to turn on the main switch responsive to a falling edge of the clock.

9. The direct feedback isolated power converter of claim 1, wherein the converter is a flyback converter.

10. A method of providing direct feedback control in an isolated power converter, the power converter having a transformer with primary, secondary, and auxiliary windings, a main switch coupled to the primary winding and an auxiliary switch coupled across the secondary winding so as to selectively short circuit the secondary winding, the method comprising:
using a feedback circuit on a secondary side of the converter to:
detect an output load on the converter;
provide a variably delayed gate drive signal to the auxiliary switch responsive to the output load, wherein the variable delay is increased in response to a light load on the converter and decreased in response to a relatively higher load on the converter, wherein the variable delay determines timing of establishment of free ringing of the transformer.

11. The method of claim 10, further comprising:
using a PWM controller on the primary side of the converter and coupled to the auxiliary winding to selectively activate the main switch responsive at least in part to establishment of free ringing of the transformer.

12. The method of claim 11, wherein using the PWM controller to selectively activate the main switch comprises selectively activating the main switch at a variable frequency.

13. The method of claim 11, wherein using the PWM controller to selectively activate the main switch comprises selectively activating the main switch at a fixed frequency.

14. The method of claim 13, wherein selectively activating the main switch at a fixed frequency comprises:
turning off the main switch responsive to a clock signal; and
turning on the main switch responsive to free ringing of the transformer.

15. The method of claim 10, wherein the feedback circuit includes a proportional, proportional integral, or proportional-integral-derivative control loop.

16. The method of claim 10, wherein the feedback circuit includes a hysteretic control loop.

17. A direct feedback flyback converter comprising:
a transformer having a primary winding electrically coupled to an input source, a secondary winding electrically coupled to an output load, and a bias winding, the windings being magnetically coupled to one another;
a main switch coupled in series with the primary winding and responsive to a controller to alternately close, thereby storing energy from the input source in the transformer, and open, thereby transferring the stored energy from the transformer to the load via the secondary winding; and
an auxiliary switch coupled across the secondary winding and responsive to a feedback circuit to selectively short circuit the secondary winding to control when free ringing of the transformer is established;
wherein the feedback circuit is coupled to an output voltage of the converter and the controller is coupled to the bias winding.

18. The direct feedback flyback converter of claim 17, further comprising a diode coupled in series with the auxiliary switch and configured to block current through the auxiliary switch during transformer reset.

19. The direct feedback flyback converter of claim 17, wherein the controller operates at a variable frequency.

20. The direct feedback flyback converter of claim 17, wherein the controller operates at a fixed frequency.

* * * * *